Helmut Heimberger
INVENTOR.

BY Karl G. Ross
Attorney

United States Patent Office 3,490,970
Patented Jan. 20, 1970

3,490,970
METHOD OF MAKING A SEPARABLE SLIDE FASTENER WITH A REINFORCED END PORTION
Helmut Heimberger, Essen, Germany, assignor to Opti Holding A.G., Glarus, Switzerland, a corporation of Switzerland
Continuation-in-part of application Ser. No. 562,877, July 5, 1966. This application July 19, 1966, Ser. No. 566,413
Claims priority, application Germany, July 21, 1965, O 11,001
Int. Cl. A44b *19/40;* B32b *31/20*
U.S. Cl. 156—66                                    3 Claims

ABSTRACT OF THE DISCLOSURE

Method of making a slide fastener with an end reinforcement wherein a wire mesh is applied to the stringer tapes and is bonded thereto with thermoplastic material from which the end-stop members are formed and which constitutes a foil stiffening the tape in the region of the end-stop members. The thermoplastic material is bonded to the wire mesh under heat and pressure such that the thermoplastic penetrates the interstices of the wire mesh.

---

This application is a continuation-in-part of my copending application Ser. No. 562,877, filed July 5, 1966 and entitled: Separable Slide Fastener.

In the aforementioned co-pending application, I describe an improved separable slide fastener having a pair of matingly interengageable slide-fastener halves each provided with a support tape or band and a slide-fastener coupling element strung along the edge of the respective tape. Such slide fasteners also include end-stop members preventing the withdrawal of the slider from one of the coupling elements at at least one end of the tape as well as co-operating connecting members adapted to be joined to bring the respective edges of the tape together so that displacement of the slider will cause a mating connection of the coupling elements.

The co-pending application also notes that the production of slide-fastener strips by severing individual lengths from a continuous web of interconnected slide-fastener halves has been described in still earlier pending applications. Thus, in my applications Ser. No. 543,921 (now abandoned) and 543,974, filed Apr. 20, 1966 and my subsequent applications Ser. No. 544,487 now patent No. 3,431,337 and 545,587 (now abandoned) of Apr. 22 and Apr. 27, 1966, respectively, there are described methods of forming slide-fastener assemblies from continuous webs of this character. In general, the carrier band may be a fabric or film of thermoplastic or nonthermoplastic filamentary material or a thermoplastic foil while the coupling elements are constituted as molecularly-oriented linear polymers (e.g. a polyamide such as nylon) or chains or series of metallic coupling elements or thermoplastic members bonded to the respective tape. When the coupling element is continuous, it may have the configuration of a helical coil (usually somewhat flattened) or of a meander, heads being provided upon the turns for engagement between the turns of the complementary coupling element.

As pointed out in application Ser. No. 562,877, the disadvantages arising with respect to earlier separable slide fasteners could be avoided by providing a substantially continuous slide-fastener web or band having interconnected slide-fastener halves with a reinforcing web at the locations at which the individual lengths of slide fastener are separated by severing from the continuous web. A reinforcing foil of a thermoplastic material may thus be bonded to the web or, when the web itself is composed of thermoplastic tapes and/or coupling elements, of a fabric forced under heat and pressure into the web so as to be substantially completely imbedded therein. At the regions corresponding to the separable ends of the length of slide fastener, the synthetic-resin foil and/or the coupling elements of one or both slide-fastener halves are shaped into respective ribs extending along the juxtaposed edges of the slide-fastener halves by the application of heat and pressure in advance of any subdivision of the web. The mating male and female connecting members at the corresponding ends of the individual lengths of the slide fastener are thus formed in two stages, namely, the production of the ribs prior to severing of the web during an initial stage and the final formation of one or both connecting members upon these ribs during a second stage. The box-like or socket-shaped female member can thus be clamped upon the corresponding rib or connected therewith by heat and pressure while the other rib may be jacketed in metal or can serve directly as the male connecting member. It has been found, accordingly, that the mounting of the female connecting member upon the preformed rib, whose location vis-á-vis the other rib, the coupling elements, etc. is established without difficulty because this rib is formed prior to subdivision of the web, is greatly facilitated and can be carried out with great precision in spite of the fact that it is effected after the separation of the individual lengths of slide fastener from the web.

It is an important object of the present invention to provide an improved slide-fastener assembly which embodies principles originally set forth in the aforementioned parent application but represents a further extension of these principles.

As observed in the parent application, it has been proposed earlier to provide textile strips as reinforcing members for the support tapes by treating such fabric strips with stiffening substances. This arrangement has been found to be disadvantageous when the slide fastener (as part of the garment or other article to which it is attached) is subjected to rigorous washing in hot water or multiple washings in warm water. The fabric stiffener or reinforcement appears to undergo a softening which renders it unsuitable. Moreover, the use of this type of stiffener in helical or meandering slide fasteners in which the coupling element is composed of a continuous plastic thread has also been disadvantageous. In these systems, the continuous coupling element is affixed to the support band by the use of chainstitching, filler threads, and other techniques resulting in the passage of the coupling element through the body of the tape. The slider must be guided along and over these coupling elements and it has, therefore, been the practice to round off the side of the coupling element opposite the heads thereof where the flanks of the slider are guided. The slider itself must be provided with a relatively narrow passage for the coupling elements in order to ensure that it can pass therealong without twisting, jamming or canting. When textile strips are used as the stiffeners for the support tapes, the minimum width requirement of the passage in the slider cannot be fulfilled and either the reinforcement must be held to an insignificant dimension or dispensed with entirely; when the fabric strip is spaced from the coupling element it becomes ineffective as a stiffener. The conventional arrangements whereby metallic coupling elements are provided in spaced-apart relationship along the edges of the tapes also cannot be adequately stiffened by the use of fabric bands in the manner described. Here it must be pointed out that one purpose of such stiffeners is to facilitate the gripping of the mating ends of a separable slide fastener by the user. When the stiffening effect is destroyed by washing, the support band tends to flex at the male and female connecting members and insertion of the former into the latter through the slide is rendered difficult. When individual coupling elements of a metallic type are employed, it is found that the stitching areas at which the coupling elements are attached and the regions bridged by the stiffener suffer distortion from washing so that dislocation of the coupling elements is common. All in all, therefore, the use of conventional fabric strips to reinforce the separable ends of a slide fastener, to improve the grippability of these ends, to prevent dislocation of the male and female connecting members, and to facilitate insertion of the male member into the slider and the female member has been unsatisfactory.

It is, accordingly, a more specific object of this invention to provide an improved slide fastener of the separable type with a reinforced end portion.

These objects and others which will become apparent hereinafter are attained, in accordance with the present invention, by laminating to the tapes of the separable ends of a slide fastener, advantageously prior to its subdivision from the web and on one or both sides thereof, a wire mat extending substantially the full width of the support tapes with a thermoplastic material, filling the interstices of the mat, under heat and pressure. The wire mat can be constituted as a fabric with an open mesh or interstitial structure so that the thermoplastic of the slide-fastener web can be stored in the interstices of the reinforcing strip and substantially encapsulate the latter under heat and pressure while penetrating the support tape and bonding thereto.

According to a more specific feature of the present invention the wire-fabric strip serving as the reinforcing means is constituted from metal wire. Alternatively, the reinforcing wire-fabric band can be constituted from a monofilamentary synthetic resin which, although thermoplastic, has a softening point in excess of that of the bonding thermoplastic filling its interstices and thus is substantially unaffected by the heat and pressure used to bond the reinforcement to the web.

An essential feature of the present invention resides in the provision, in combination with the mesh described above, of the flowable (at elevated pressure and temperature) thermoplastic material stored within the interstices of the mesh and adapted to bond the reinforcing mesh to the substrate, namely, the slide-fastener tape. When the latter is a fabric, the pressure serving to laminate the mesh to the fabric tape is sufficient to cause a thermoplastic bonding material or filler to penetrate the latter. The invention includes several highly convenient variants. Thus, for example, the thermoplastic bonding material may be retained wholly within the wire mesh, which may be plastic or metallic as indicated earlier. Furthermore, the bonding plastic filler may also impregnate a fabric which is simultaneously laminated to the mesh, so that the thermoplastic penetrates the interstices both of the overlying fabric and the underlying tape. After heating, the mesh and its filler may be readily deformed to substantially any configuration although, upon setting, the mesh resists any deformation in or out of its plane.

In general, best results are obtained when the filler resin, preferably a polyester or polyester-based compound, is transparent. Since additional thermoplastic material is provided in the form of the filler of the mesh, any fabric overlay is readily encapsulated in spite of the fact that it is applied concurrently with the bonding of the mesh to the substrate. Repeated washings can have no effect either upon the encapsulated fabric or the wire- or resin mesh. Furthermore, the additional thermoplastic material is readily molded into the ribs of the connecting formations in the manner described in my parent copending application identified earlier, and any perforations formed by stitching the coupling elements to the tape in the region of the reinforced zone are also filled by the thermoplastic material. The deformability of the mesh, when the filled layer is heated, is the only significant limitation upon the type of mesh used. The additional resin can be readily molded in any desired configuration and forms a monolithic mass with the ribs which are die-shaped under heat and pressure from the thermoplastic of the coupling elements. Additional, the filler cords, attaching threads and the like in the region of the connecting members are fully embedded in the resin and are not damaged by the slider during the opening and closing movements.

It is also advantageous if a portion of the liquefied synthetic-resin mass of the coupling elements is squeezed from the region of the connecting ribs laterally to penetrate the support tape and the mesh or between adjacent turns of the coupling elements to stiffen the latter. This additional reinforcement of the turns or individual coupling elements in the region at which the male and female members are to be connected has been found to be highly important.

The above and other objects, features and advantages of the present invention will become more readily apparent from the following description, reference being made to the accompanying drawing in which.

Figure 1:
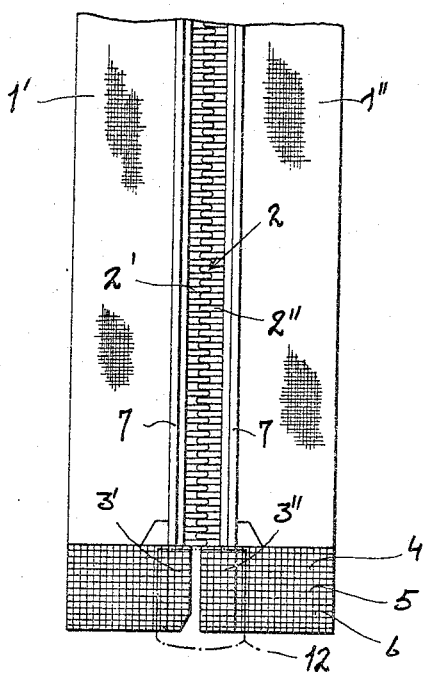
FIG. 1 is an elevational view of the lower end of a separable slide-fastener length prior to the application of the female coupling member thereto and illustrated partly in diagrammatic form.
Figure 2:
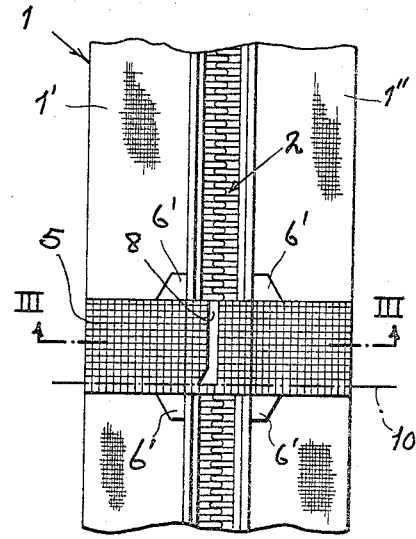
FIG. 2 is a view of a corresponding portion of a continuous web prior to the severing of the length of slide fastener therefrom.
Figure 3:
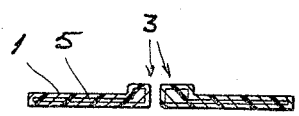
FIG. 3 is a section taken along the line III—III of FIG. 2.

In FIGS. 1–3, I show a pair of support tapes 1' and 1" which are coupled together at their respective coupling elements 2' and 2" to form a continuous slide-fastener web 1 (FIG. 2) which is severed at 10 to form the individual length of slide fastener illustrated in FIG. 1. The interconnected coupling elements 2' and 2", here shown as continuous, form a guide strip 2 upon which the slider (not shown) glides to open and close the fastener. The slider is of conventional construction. The coupling elements 2' and 2" are held in place of welts 7 of chain-stitching which may also serve to attach a filler cord to the respective tapes 1' and 1" in conventional manner. In fact, such welts are illustrated in greater detail in my aforementioned copending applications. In accordance with the principles of my application Ser. No. 562,877, the slide-fastener strip is provided with ribs 3' and 3", the former constituting the male connecting member while the latter serves to receive a box-like socket constituting the female connecting member. The male member 3' can be inserted into this female member through the corresponding passage in the slider when it is desired to close the fastener. On one or both sides of the support tape 1', 1" (here shown at both sides) I provide a stiffening layer 4 of wire mesh. It will be understood that the wire mesh according to the present invention can also be employed as a stiffening inlay in the systems described in those of my cited prior applications dealing with the formation of endstop members in nonseparable slide fasteners with reinforced ends.

The stiffening layer 4 includes the wire mesh or fabric 5 filled with a thermoplastic synthetic resin 6 (i.e. a polyester) which under heat and pressure penetrates the support tapes 1', 1" and bonds the mesh strips 5 thereto while wholly encapsulating them. In this arrangement, the strips 5 are composed of a synthetic-resin monofilament (e.g. of nylon) whose softening point is substantially higher than that of the filler 6. Moreover, the mesh 5 is turned around the inner edges of the respective support band so as to lie both above and below the latter with a fold at the formations 3' and 3" which are constituted at least in part of the synthetic resin of the coupling elements 2' and 2" and at least in part of the filler resin 6. Thus the wire mesh 5 is bonded under heat and pressure to the respective support band with the filler resin penetrating the interstices of the latter upon heating. The filler resin of the wire mesh 5 is so selected that, while it may soften to permit plastic deformation during the production of the formations 3' and 3", it does not flow in the manner of the resin 6 and thus retains its stiffening character both in the formations 3' and 3" and in the layers embracing the support tapes. The web 5 is wholly embedded in the formations 3' and 3" which can be finished in the manner described in the parent application; both the production of these formations and the laminating step can be carried out in a single operation via a die arrangement as there described, the fastening welt and filler cord being incorporated in the formations as well.

As indicated in FIG. 2, the ribs 3' and 3" are separated by a window 8 formed by stamping material from the web 1. Thereafter or concurrently, the individual lengths of slide fastener can be separated along the line 10 and the female connecting member applied (dot-dash line 12 in FIG. 1). Webs 6' of the filler resin 6 can be extruded laterally between the dies to reinforce or stiffen the initial turns of continuous coupling elements or the initial members of a train of discrete coupling elements as identified earlier.

Figure 4:
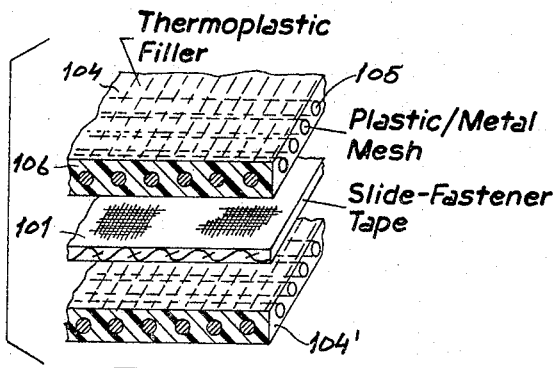
FIG. 4 is a perspective view illustrating a stage in the manufacture of a slide fastener in accordance with a feature of this invention.
Figure 6:
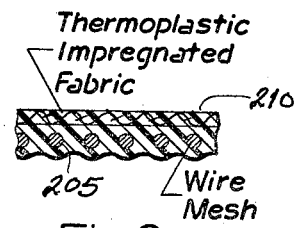
FIG. 6 is an enlarged cross-sectional view illustrating another point in connection with the invention.
Figure 5:
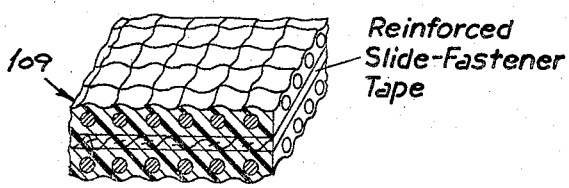
FIG. 5 is a view of the laminated reinforced end of the fastener, also in diagrammatic perspective form.

FIG. 4 shows a modified arrangement whereby the support tape 101 of fabric receives the resin-filled layers 104 and 104' from above and below. These layers 104, 104' comprise metal and wire-mesh cores 105 whose interstices contain the thermoplastic filler 106. When the reinforcing layers 104 and 104' are applied under pressure and heat against the support tape 101, the resin penetrates the latter (FIG. 5) so that a reinforcing monolith is constituted at 109. The reinforcing layers can also be overlain by fabric layers 210 (FIG. 6) which are permeated with the thermoplastic material filling the interstices of the wire mesh 205. The fabric layer 210 can be applied to the mesh layer after it is placed upon the tape so that penetration of the resin into both the fabric and the tape occurs simultaneously. Alternatively, the resin can be impregnated into the fabric prior to the application of the reinforcing layer to the tape.

I claim:
1. A method of making a slide fastener, comprising the steps of:
 (a) forming a slide-fastener length by affixing respective elongated mating coupling elements of thermoplastic along confronting edges of a pair of support tapes while providing along each coupling element a respective elongated member affixed to the support tapes and at least in part retaining each coupling element thereon while flanking same remote from the other coupling element;
 (b) applying a transverse strip of wire mesh along at least one face of each of said tapes at an end of the slide-fastener length whereby said coupling elements and said members at least partly overlap with said strips; and
 (c) bonding said wire mesh to said tapes with thermoplastic synthetic-resin material under heat and pressure such that the thermoplastic material fills the interstices of said wire mesh and bonds same to said coupling elements and said members, while simultaneously molding from said thermoplastic synthetic resin filling the interstices of said mesh and the portions of said coupling elements and said members overlapping with said strips, a respective rib aligned with each of said coupling elements.

2. The improvement defined in claim 1 wherein said thermoplastic material is applied to said wire mesh prior to its bonding to said tapes and constitutes a filler within the interstices of said wire mesh flowable under said heat and pressure unto said tapes to bond said wire mesh thereto.

3. The improvement defined in claim 1, further comprising the step of applying to said wire mesh a further layer of a fabric whereby said thermoplastic material flows at least in part into the interstices of said fabric under said heat and pressure.

References Cited

UNITED STATES PATENTS

| 2,582,456 | 1/1952 | Poux | 24—205.16 |
| 3,030,255 | 4/1962 | Winston | 264—273 XR |
| 3,009,235 | 11/1961 | De Mestral | 24—204 XR |

FOREIGN PATENTS 513,399 10/1939 Great Britain.

PHILIP DIER, Primary Examiner

U.S. Cl. X.R.

24—205.11, 205.16; 156—196, 298, 306; 264—249, 273